United States Patent
Wells

[15] 3,675,311
[45] July 11, 1972

[54] THIN-FILM DIFFUSION BRAZING OF NICKEL AND NICKEL BASE ALLOYS

[72] Inventor: Robert R. Wells, Fullerton, Calif.
[73] Assignee: Northrop Corporation, Beverly Hills, Calif.
[22] Filed: July 2, 1970
[21] Appl. No.: 52,118

[52] U.S. Cl. .................................29/498, 29/501, 29/504
[51] Int. Cl. ...................................B23k 31/02, B23k 35/24
[58] Field of Search.................29/198, 498, 501, 502, 504, 29/199, 473.1

[56] References Cited

UNITED STATES PATENTS

| | | | |
|---|---|---|---|
| 2,570,248 | 10/1951 | Kelley | 29/473.1 X |
| 2,739,375 | 3/1956 | Coxe | 29/473.1 X |
| 2,847,302 | 8/1958 | Long | 29/198 X |
| 2,857,663 | 10/1958 | Beggs | 29/498 X |
| 3,001,269 | 9/1961 | Moore et al. | 29/473.1 X |
| 3,148,038 | 9/1964 | Wolfe | 29/502 X |
| 3,395,993 | 8/1968 | Bristow | 29/498 X |
| 3,513,535 | 5/1970 | Clarke | 29/473.1 |
| 3,561,099 | 2/1971 | Mizuhara | 29/198 X |

*Primary Examiner*—John F. Campbell
*Assistant Examiner*—Ronald J. Shore
*Attorney*—Sokolski & Wohlgemuth and W. M. Graham

[57] ABSTRACT

A method of joining nickel and nickel base alloys comprising a thin film of metal selected from a group consisting of titanium and niobium. Coating both sides of the film chosen with a metal selected from the group consisting of silver and gold, placing the coated film between the surfaces to be joined, pressing the surfaces together whereby the coated film forms an intermediate layer, and heating the film to at least a eutectic temperature to form a brazing liquid and holding for a period of time sufficient to obtain a ternary mixture of the metals utilized in the area between the surfaces joined.

5 Claims, No Drawings

THIN-FILM DIFFUSION BRAZING OF NICKEL AND NICKEL BASE ALLOYS

Nickel and nickel base alloys have become increasingly more important in today's advanced technology. As a result, many braze alloy systems have been developed and utilized in the fabrication of components of nickel and nickel alloys. However, to date all of the presently developed braze alloy systems have had various deficiencies. Gold base braze alloys are used on nickel. However, their high cost prevents their use in many applications. Nickel base brazing alloys have the problem of brittleness and errosiveness while many other braze alloy systems have lacked oxidization resistance. Another disadvantage of several of the currently existing braze systems is that they can only be prepared in the powder form. Problems of powder placement and powder purity become quite noticeable with these types of braze systems.

In copending application Ser. No. 778,802 filed Nov. 25, 1968, now abandoned assigned to the same assignee, there is disclosed a method of brazing nickel and nickel base alloys, utilizing a thin film of brazing material to obtain a strong braze joint. In this copending application a thin film of titanium or niobium is used to form a binary eutectic system with nickel and nickel base alloys. Though the utilization of the niobium or titanium as disclosed in that application is most suitable, it should be noted that for niobium the material is generally heated to at least 1,175° C, while for titanium the intermediate layer is generally required to be heated to at least 1,110° C. For some applications, depending upon the nickel base alloy used, it is particularly desirable to lower the temperature below that disclosed in the copending application required in order to obtain a brazed joint. There are various nickel base super alloys strengthened by carbides which will go into solution at higher temperatures. Upon cooling, these carbides have a tendency to come out of solution in a different and more brittle form. This can be prevented by utilizing a lower temperature to achieve a brazed joint then is, for example, utilized in the copending application. In addition, regardless of lowering the temperature, it is desirable to obtain better flow in wetting of the brazed joint with some of the nickel base super alloys.

Thus it is an object of this invention to provide a low temperature joining system for nickel and nickel base alloys utilizing a thin film of brazing material.

Another object of this invention is to provide a method for brazing nickel and nickel base alloys using a brazing material with good wettability and flow for the nickel and nickel base alloys.

The above and other objects of this invention are accomplished by a thin film diffusion brazing method which is an improvement upon the method disclosed in the previously filed copending patent application mentioned above. As indicated, that application disclosed the utilization of a thin film of either titanium or niobium and involved heating the material to a temperature to achieve the solid state diffusion between the nickel and either the titanium or the niobium. After sufficient diffusion occurred a liquid comprised of nickel and titanium or nickel and niobium was formed and diffusion occurred more rapidly. The eutectic liquid composition is rapidly formed and wetting in full took place along the nickel surface. Further diffusion of the nickel into the liquid joint region causes solidification of the joint and eventually additional solid state diffusion results in the formation of a desired joint composition. The herein invention improves upon such a method by coating either the titanium or niobium film with a thin layer of either silver or gold. The coated material is then placed between adjacent surfaces to be bonded. The pieces are held together at a temperature in excess of 950° C for a time period sufficient to achieve a solid state diffusion of the material into the nickel or nickel base alloy, and diffusion of the nickel or nickel base alloy into the joint area. The resulting joint produced can have characteristics close to those of the nickel or nickel base alloy, which it is joining. I believe that the invention will be further understood from the following detailed description and specific examples.

As previously indicated, the herein invention is an improvement upon that disclosed in copending application Ser. No. 778,802 assigned to the same assignee. As pointed out in this previous application, the thin film or foil of niobium or titanium was disposed between the surfaces to be joined. Alternatively, a thin film of either of these materials could be deposited on one of the surfaces to be joined by conventional vapor deposition or vacuum deposition techniques. Niobium and titanium require different temperatures when used alone in order to achieve the desired brazed joint. It was pointed out in the prior case that niobium and nickel form a eutectic at 1,175° C which will vary slightly dependent upon the particular nickel alloy utilized. However, it was found that in order to obtain a satisfactory eutectic, liquid formation, a temperature of 1,220° C was required when utilizing niobium. It was noticed that a eutectic liquid would start to form at temperatures as low as 1,175° C, however better wetting and flow was not achieved until the 1,220° C temperature.

Utilizing titanium as an intermediate layer to diffusion bond nickel surface it was found that a eutectic was formed at 955° C. However, poor quality joints exist at temperatures below the next highest eutectic which is about 1,110° C. As indicated in the prior application it is preferred to heat the material to a temperature of about 1,150° C. The purpose of the present invention is to improve wetting and flow of the intermediate titanium or niobium materials at the previously disclosed temperatures and/or to lower the required temperature of brazing and yet obtain a good joint.

The diffusion brazing conditions of either niobium or titanium alone could be readily determined from available binary phase diagrams of either of these metals with nickel. However, adding a coating of either gold or silver to the intermediate film of niobium or titanium presents a much more complex system to analyze. Obviously the reaction product of these foregoing combinations of elements is a ternary mixture of nickel, niobium and silver or gold, and nickel titanium and silver or gold. It is believed that the liquid formed during the brazing is due to reactions such as a minimum melt point and monotectic and eutectic type reactions inherent in the binary combinations. Thus it is desirable to study the binary reactions, if possible, utilizing the foregoing materials. Following are the binary reactions that might be taking place between the elements in the early stages of diffusion brazing. However, as the reactions continue and become ternary mixtures then more complex reactions take place.

Nb-Ni forms a eutectic at 1,170°C, Ti-Ni at 955°C, Ag-Ni at 960°C; Au-Ni has a minimum meltpoint at 950°C, Ag-Ti forms a pertectic at 1,030°C, and Au-Ti forms a pertectic at 1,123°C. No information about the reactions for Ag-Nb and Au-Nb is available, nor is information about the ternary reactions available.

In view of the foregoing temperature ranges for binary reactions, it is apparently necessary to heat the joint of this invention to a temperature in excess of 950°C. The required diffusion time to achieve the desired end product will depend both on the quantity of the intermediate used and the diffusion temperature. At higher temperatures, the diffusion reaction is faster, thus, it is preferred to utilize temperatures on the order of 1,090° to 1,150°C. For example, utilizing a niobium foil coated with gold at a temperature of 1,150°C, a good braze joint is obtained in about 5 minutes. This joint is achieved at a temperature of about 70°C less than that preferred to be used when only niobium foil serves as the braze intermediate. Once again utilizing 1,150°C for titanium foil coated with silver or gold for example, it is found that improved wetting and better flow is achieved than when the same temperature is utilized for plain titanium foil. Alternatively a good brazed joint is obtainable with titanium foil coated with gold at a lower temperature of 1,095°C. This indicates that a significant improvement in the temperature of brazing can be achieved utilizing the principal of this invention.

Generally it is preferred that the braze joint be heated at a temperature from 1,095 to 1,150°C in order to achieve the most desirable results of the invention. However, the temperature of heating can be raised as high as the base alloy will allow. The aforegoing preferred temperatures and times of heating will vary depending upon the materials utilized and the base material. Generally, it has been found that the heating time would exceed 5 minutes.

The titanium and niobium utilized as the main material can vary in thickness from 0.000 to 0.003 inch. This can be in the form of preferably a thin foil which can then be coated on both sides with a layer of either silver or gold. The layer of silver or gold can vary in thickness from 0.00005 to 0.001 inch. Where a coated thin foil of titanium or niobium is most suitable, it should be apparent that as an alternatiVe one of the surfaces to be bonded can first be coated by vapor deposition or the like with either a layer of silver or gold. Then the titanium or niobium can be disposed thereon with another coating of silver or gold on top of that. As a further alternative, the two surfaces to be joined can each be coated with a layer of silver or gold and a thin separate foil of only the titanium or niobium utilized therebetween. The purpose is to achieve in a braze joint area a layer of either the titanium or niobium, being separated from the surfaces to be joined by a thin coating of silver or gold in accord with the hereon invention.

Relative amounts of the materials utilized in a braze joint can be tailored to match the surfaces being joined and the heating equipment. The thinnest layers possible that will form sufficient brazing liquid for the joint should be utilized within the above stated ranges. It should be pointed out that greater thicknesses could be utilized. However, the times required to achieve diffusion would be extended to the point where the heron invention would not be practicable for commercial purposes. Thus, regardless of the amount of starting materials, namely, titanium and niobium or gold and silver, one should maintain a temperature in the joint for a sufficient period of time to obtain a final joint composition which is considered desirable for the environmental temperatures to be encountered by the brazed surfaces. For example, where the temperature limitation of the brazed surfaces is to be at least 800° C or above, the joint composition should contain less than 10 weight percent titanium or less than 20 weight percent niobium. Where gold is used as a coating, such a joint should contain less than 50 weight percent gold. Where silver is utilized the joint should contain less than 5 weight percent of this material. The remaining portion of the composition of the joint will, of course, be nickel which will result from the diffusion of the nickel into the joint, and likewise diffusion of the joint materials into the surfaces to be joined. The foregoing weight requirements of the reactants are set forth in order to obtain a strong joint which will sustain temperatures above 800° C. If the temperature requirement for the joint were to decrease below the 800° C level more of each component other than nickel could be tolerated. However, since the nickel and nickel base alloys are particularly used for high temperature applications it is believed that the foregoing range of weight percentages to be present in the final joint will be preferred.

It should be pointed out that a maximum joint would contain possibly very little of each of the components other than nickel. That is, if the brazed temperature was maintained for sufficient period of time and the solubility of the components was sufficient, the joint could take a much higher percent of nickel, while the titanium or niobium and gold or silver were to diffuse into the surfaces joined. Thus, there is no minimal requirement for the amount of these materials in the brazed joint, since obviously the most preferred joint possible would be exactly the same constituency as the surfaces that are joined.

The foregoinG discussion has related to raising the temperature of the intermediate layer at least to a eutectic temperature which was indicated as being at least 955° C. However, it is noted that the final step in the herein method involves the solid state diffusion of the intermediate materials wherein the amount of either the niobium or titanium and silver or gold layer decreases with time due to such diffusion. Since this last step is solid state diffusion, it should be apparent that the intermediate layer need not be kept at the initial eutectic temperature during the solid state diffusion step. One can achieve such solid state diffusion at lower temperatures. In some instances it might be desirable to do this. The main penalty for lowering the temperature for the final solid state diffusion is that the time of such diffusion will increase significantly. Thus, it should be clear that it is not at all mandatory for the intermediate layer to be continually kept at the initial eutectic temperature.

As indicated, the herein invention is applicable to nickel and nickel base alloys. In the following table the composition for some of the more popular conventionally used materials are given. However, it should be understood that the herein invention is not solely limited to these specific compositions.

TABLE I

Approximate Chemical Composition

| Alloy | Ni % | Cr % | Co % | Mo % | Ti % | Al % | Others |
|---|---|---|---|---|---|---|---|
| Ni | 99.9 | | | | | | |
| Nichrome V-Cb | 80 | 20 | | | | | Cb (Nb) |
| Inconel 713 | 74.4 | 12.5 | | 4.2 | 0.8 | 6.1 | 2 Cb (Nb) |
| Rene' 41 | 55.2 | 19 | 11 | 10 | 3.1 | 1.4 | |
| Udimet 700 | 52.5 | 15 | 18.5 | 5.2 | 3.5 | 4.25 | 1 Fe |
| Inconel 700 | 47 | 15 | 28.5 | 3.7 | 2.2 | 3.0 | 0.7 Fe |

Surfaces that can be joined in accord with the herein invention can vary from single lap shear specimens to butt-type diffusion couples. The quantity of the intermediate particularly required, varies depending upon form of material being joined. For example, more of the intermediate is required to form a lap-joint than some honeycomb joints. Through simple experimental procedure one can easily determine the optimum amount of intermediate material to be used for a given application. The above ranges set forth can be used as minimal requirements in order to achieve the results. These requirements can then be readily used as guidelines by one practicing the invention, to determine the most suitable ranges for a given application.

It is believed that the invention will be further understood from the following detailed examples in which pure nickel sheets were joined. In the examples, the specimens were held at the brazing temperature only long enough to reach an equilibrium temperature in the joint. This generally occurred in a time period slightly in excess of five minutes. In all the examples, the specimens were pure nickel sheets having dimensions of 2 inches by 2 inches with a verticle "tee" member ½ x 3 inch size. The verticle member was bent unto a U shape to make it self supporting. The brazing foil was cut to match the joint area. The brazing was done in a protective atmosphere such as a high purity argon or a vacuum of $10^{-4}$ torr. It is preferred to utilize a protective atmosphere so as to prevent contamination of the niobium or titanium foil.

EXAMPLE I.

A 0.001 inch niobium foil was coated on both sides with a gold layer having a thickness of 0.00025 inch. The gold was plated onto the niobium foil by standard electroplating techniques.

The sheets with the foil therebetween were then heated at 220°C per minute to 1150°C and held for 5 minutes. The reactions formed a high fluidity-type brazing liquid. Temperatures were determined with calibrated thermocouples.

The brazed joint was subjected to an electron microprobe analysis that indicated a final joint composition containing between 40 and 50 weight percent nickel, 25 to 30 weight percent gold, and 25 to 30 weight percent niobium. It is to be noted that this brazed joint was obtained at 1150°C, which is a temperature approximately 70° C lower than that at which a preferred brazed joint is obtained utilizing only niobium.

EXAMPLE II

The procedure in Example I is repeated utilizing titanium foil having a thickness of 0.0015 inch. The titanium foil was coated on both sides with a layer of silver having a thickness of 0.0005 inch. Standard silver electroplating techniques were used. The material was heated to 1,150° C until that temperature was obtained in the brazed joint, once again forming a high fluidity type brazing liquid. This liquid had improved wetting and better flow characteristics than titanium alone at the aforegoing 1,150° C temperature. The electron microprobe analysis of the final product indicated that the joint was comprised of 60 to 80 weight percent nickel, 20 to 30 weight percent titanium, and 5 to 10 weight percent silver. In order to decrease the amount of silver in the braze joint to less than 5 weight percent, as is preferred, a longer residence time at the braze temperature is required.

EXAMPLE III

Example II was repeated utilizing a titanium foil of the sAme thickness which was, however, coated on both sides with electroplated gold having a thickness of 0.0002 inch. The brazing reaction, however, in this example was carried out at 1,095° C, forming a moderately fluid brazing liquid. The liquid formed had a fluidity about equivalent to that of titanium along brazed at 1,150° C.

The titanium content in the brazed joint was between 25 to 30 weight percent, and the gold between 25 to 30 weight percent. This means that when this system is used to take advantage of the lower brazing temperature, a long solid state diffusion cycle will be required.

I claim:
1. A method of joining nickel members comprising:
   disposing a thin film of a metal selected from the class consisting of niobium and titanium between the mating surfaces of the nickel members to be joined,
   disposing a coating of a metal selected from the class consisting of silver and gold between said film and each of said surfaces,
   placing the mating surfaces of the members together, wherein said film and coating of metal form an intermediate layer of material between said surfaces,
   heating said intermediate layer to at least a eutectic temperature,
   and holding said surfaces at said eutectic temperature for a period of time sufficient to obtain a ternary mixture of metals in said intermediate layer and to bond the nickel members.
2. The method of claim I comprising:
   applying said coating to both sides of said film prior to placing said film between said surfaces to be joined.
3. The method of claim I comprising:
   heating said intermediate layer to at least 950° C.
4. The method of claim 3 comprising:
   heating said intermediate layer to between 1,090° and 1,150° C.
5. The method of claim 3 comprising:
   maintaining said intermediate layer at said temperature until equilibrium temperature conditions are achieved throughout said layer.

* * * * *

PO-1050
(5/69)

UNITED STATES PATENT OFFICE
CERTIFICATE OF CORRECTION

Patent No. 3,675,311          Dated July 11, 1972

Inventor(s)   ROBERT R. WELLS

It is certified that error appears in the above-identified patent and that said Letters Patent are hereby corrected as shown below:

Column 1, Line 18: Delete the words "now abandoned".

Signed and sealed this 9th day of January 1973.

(SEAL)
Attest:

EDWARD M. FLETCHER, JR.          ROBERT GOTTSCHALK
Attesting Officer                Commissioner of Patents